(12) United States Patent
Rampana et al.

(10) Patent No.: US 11,046,113 B2
(45) Date of Patent: Jun. 29, 2021

(54) MOTORCYCLES TYRE (71) Applicant: PIRELLI TYRE S.P.A., Milan (IT)

(72) Inventors: Barbara Rampana, Milan (IT); Lisa Grassi, Milan (IT); Mario Mariani, Milan (IT); Pierangelo Misani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 78 days.

(21) Appl. No.: 16/343,738

(22) PCT Filed: Nov. 20, 2017

(86) PCT No.: PCT/IB2017/057246
§ 371 (c)(1),
(2) Date: Apr. 19, 2019

(87) PCT Pub. No.: WO2018/096436
PCT Pub. Date: May 31, 2018

(65) Prior Publication Data
US 2019/0275835 A1 Sep. 12, 2019

(30) Foreign Application Priority Data

Nov. 22, 2016 (IT) .................. 102016000117754

(51) Int. Cl.
*B60C 9/22* (2006.01)
*B60C 9/00* (2006.01)
(Continued)

(52) U.S. Cl.
CPC ............ *B60C 9/005* (2013.01); *B60C 9/2009* (2013.01); *B60C 9/2204* (2013.01);
(Continued)

(58) Field of Classification Search
CPC . B60C 9/22; B60C 9/2204; B60C 2009/2209; B60C 2009/2214;
(Continued)

(56) References Cited

U.S. PATENT DOCUMENTS 3,977,172 A 8/1976 Kerawalla et al.
4,155,394 A 5/1979 Bhakuni et al.
(Continued)

FOREIGN PATENT DOCUMENTS

CN 101804772 A 8/2010
CN 105525410 A 4/2016
(Continued)

OTHER PUBLICATIONS

International Search Report for International Application No. PCT/IB2017/057246 filed on Nov. 20, 2017 on behalf of Pirelli Tyre S.P.A dated Mar. 14, 2018.
(Continued)

*Primary Examiner* — Kendra Ly
(74) *Attorney, Agent, or Firm* — Steinfl + Bruno LLP (57) ABSTRACT

Motorcycles tyre including a carcass structure, a zero-degree belt structure arranged in a radially outer position with respect to the carcass structure and a tread band arranged in a radially outer position with respect to the belt structure. The belt structure includes at least one hybrid reinforcing cord that has an elongation greater than 4% when subjected to a load equal to about 50 N and a tangent modulus with a monotonic progression as the elongation increases for elongations comprised between 4% and at least 9%.

14 Claims, 5 Drawing Sheets

(51) Int. Cl.
*B60C 9/20* (2006.01)
*B60C 9/18* (2006.01)

(52) U.S. Cl.
CPC ............... *B60C 2009/0078* (2013.01); *B60C 2009/0085* (2013.01); *B60C 2009/0092* (2013.01); *B60C 2009/1828* (2013.01); *B60C 2009/2214* (2013.01); *B60C 2009/2233* (2013.01); *B60C 2009/2261* (2013.01); *B60C 2009/2276* (2013.01); *B60C 2200/10* (2013.01)

(58) Field of Classification Search
CPC .... B60C 2009/2219; B60C 2009/2223; B60C 2009/2228; B60C 2009/2233; B60C 2009/2238; B60C 2009/2242; B60C 2009/2247; B60C 2009/2252; B60C 2009/2257; B60C 2009/2261; B60C 2009/2266; B60C 2009/2271; B60C 2009/2276; B60C 2009/228; B60C 2009/2285; B60C 2009/229; B60C 2009/2295; B60C 9/005
See application file for complete search history.

(56) References Cited

U.S. PATENT DOCUMENTS

| | | | |
|---|---|---|---|
| 5,558,144 A * | 9/1996 | Nakayasu | B60C 9/2009 152/526 |
| 6,533,012 B1 | 3/2003 | Jardine et al. | |
| 6,799,617 B2 | 10/2004 | Matsumura | |
| 2003/0159768 A1 * | 8/2003 | Fritsch | B60C 9/005 152/556 |
| 2004/0221937 A1 | 11/2004 | Dehnert et al. | |
| 2010/0206450 A1 | 8/2010 | Fukumoto | |
| 2011/0303339 A1 * | 12/2011 | Valle | B60C 9/08 152/548 |
| 2013/0025758 A1 * | 1/2013 | Kim | B60C 9/005 152/451 |
| 2013/0139940 A1 * | 6/2013 | Ito | C08K 5/34922 152/451 |
| 2013/0319594 A1 * | 12/2013 | Kawashima | D02G 3/28 152/548 |
| 2014/0069563 A1 | 3/2014 | Le Clerc | |
| 2016/0107485 A1 | 4/2016 | Lee et al. | |
| 2016/0318343 A1 | 11/2016 | Daghini et al. | |
| 2018/0099529 A1 * | 4/2018 | Vallet | B60C 9/005 |

FOREIGN PATENT DOCUMENTS

| | | | |
|---|---|---|---|
| CN | 105934354 A | 9/2016 | |
| EP | 0294153 A1 | 12/1988 | |
| EP | 0335588 A2 | 10/1989 | |
| EP | 0461646 A2 | 12/1991 | |
| EP | 0467585 A1 * | 1/1992 | ........... B60C 9/2204 |
| EP | 0467585 A1 | 1/1992 | |
| EP | 1698493 A1 | 9/2006 | |
| EP | 2065222 A1 | 6/2009 | |
| EP | 2218588 A1 | 8/2010 | |
| EP | 2551127 A1 | 1/2013 | |
| FR | 2796005 A1 | 1/2001 | |
| JP | S5812804 A | 1/1983 | |
| JP | H05604 A | 1/1993 | |
| JP | 2006283198 A | 10/2006 | |
| WO | 2012/146612 A1 | 11/2012 | |
| WO | 2014/006485 A1 | 1/2014 | |
| WO | 2015/137901 A1 | 9/2015 | |

OTHER PUBLICATIONS

Written Opinion for International Application No. PCT/IB2017/057246 filed on Nov. 20, 2017 on behalf of Pirelli Tyre S.P.A dated Mar. 14, 2018 5 pages.
First Chinese Office Action for CN Application No. 201780070504.2 filed on Nov. 20, 2017 on behalf of Pirelli Tyre S.P.A. dated Dec. 18, 2020 14 pages (English + Original).

* cited by examiner

MOTORCYCLES TYRE

CROSS-REFERENCE TO RELATED APPLICATIONS

The present application is the U.S. National Stage of International Patent Application No. PCT/IB2017/057246 filed on Nov. 20, 2017 which, in turn, claims priority to Italian Patent Application No. 102016000117754 filed on Nov. 22, 2016.

The present invention relates to a motorcycles tyre, in particular for motorcycles having a piston displacement lower than 500 cc.

Preferably, the tyre of the invention is used in motorcycles capable of reaching speeds not greater than 240 km/h, preferably not greater than 210 Km/h.

Motorcycles tyres typically have a high transversal curvature, so as to offer an adequate contact surface with the road surface when the motorcycle is inclined to bend.

Such tyres are also required to ensure riding stability, controllability, directionality, handling, comfort, as well as high mileage and regular wear.

A motorcycles tyre typically comprises a load-bearing structure and a tread band arranged in a radially outer position with respect to the load-bearing structure and intended to ensure adherence of the tyre to the asphalt.

In the case of motorcycles tyre having a piston displacement greater than 500 cc, the load-bearing structure comprises in particular a carcass structure and a belt structure arranged between the carcass structure and the tread band.

The carcass structure is intended, as well as to support the weight of the motorcycle, of the rider and of a possible passenger and/or load, to withstand the inflation pressure and all the lateral and longitudinal stresses which the tyre is subjected to during travel due to the contact with the road surface.

The belt structure is intended to transfer the aforementioned lateral and longitudinal stresses to the carcass structure and contributes to giving the tyre the desired characteristics of structural strength, performance (i.e. adherence, riding stability, controllability, directionality, handling) and comfort.

The carcass and belt structures comprise reinforcing cords embedded in a matrix of elastomeric material.

PRIOR ART

EP 0294153, EP 0335588, EP 461646, EP 0467585, EP 1698493, EP 2065222, EP 2551127, U.S. Pat. Nos. 3,977,172, 4,155,394, 5,558,144, 6,533,012, 6,799,617, US 2004221937 and US 20140069563 describe examples of tyres comprising radial carcass structures and zero degree belt structures including textile or hybrid reinforcing cords.

SUMMARY OF THE INVENTION

In the rest of the present description and in the following claims, when reference is made to certain values of certain angles, it is meant to indicate absolute values, i.e. both positive values and negative values with respect to a reference plane, unless specified otherwise.

Moreover, when reference is made to any range of values comprised between a minimum value and a maximum value, the aforementioned minimum and maximum values are meant to be included in the aforementioned range.

Hereinafter, the following definitions apply.

The expression "motorcycles tyre" is used to indicate a tyre having a high curvature ratio, in particular greater than 0.200, so as to be able to reach high camber angles during travelling of the motor vehicle on a bend.

The expression "equatorial plane" of the tyre is used to indicate a plane perpendicular to the rotation axis of the tyre and that divides the tyre into two symmetrically equal parts.

Figure 1:
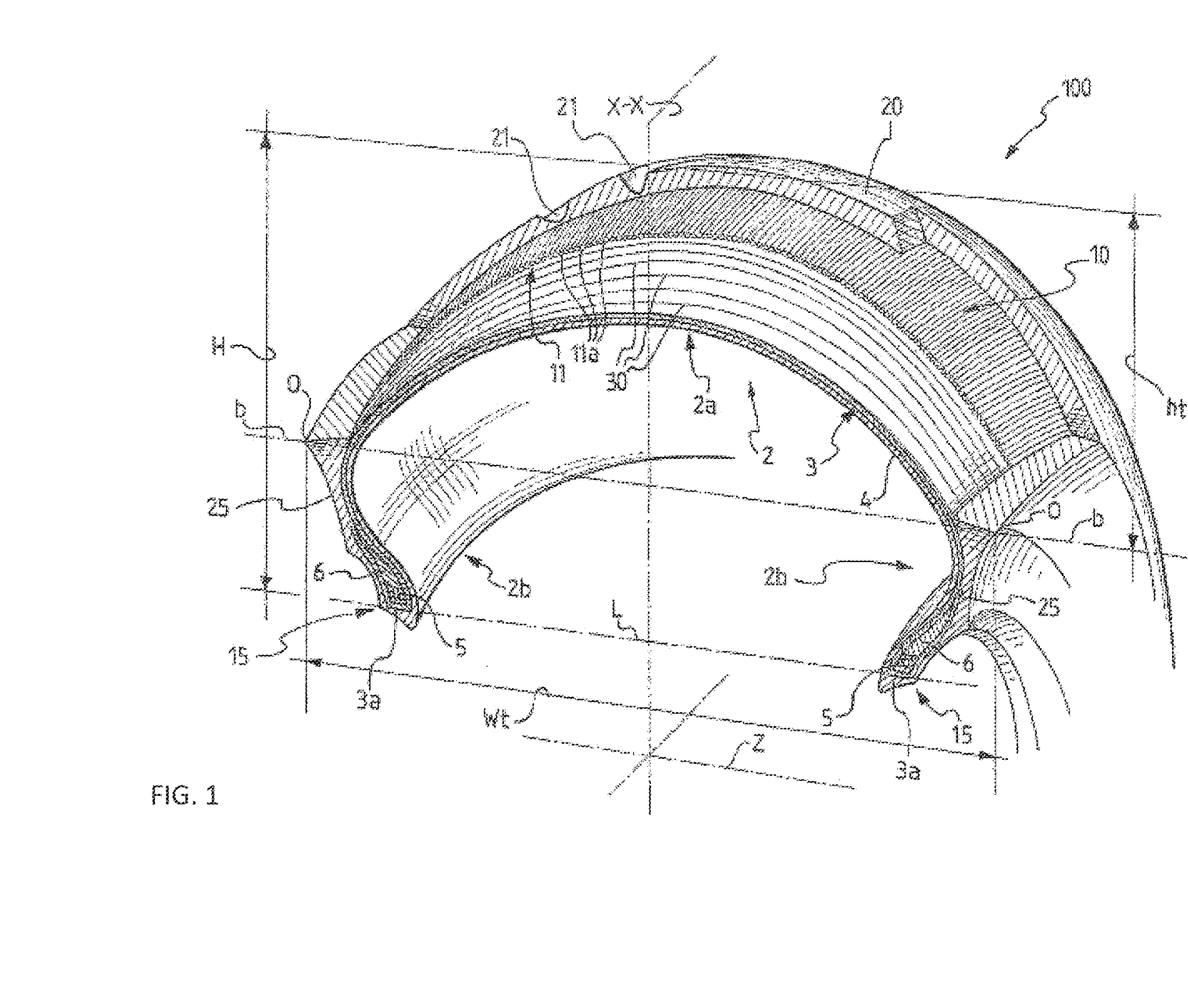
FIG. 1 is a schematic perspective section view of an axial section of a portion of a tyre according to an embodiment of the present invention.

The expression "curvature ratio", is used to indicate, with reference to FIG. 1 herewith attached, the value of the transversal curvature of the tyre, the transversal curvature being defined by the value of the ratio between the distance ht, measured on the equatorial plane X-X, of the top of the tread band from the line b-b passing through the end points O of the tread band and the distance wt between said end points O of the tread band. If the end points of the tread band are not easily identifiable, for example due to the lack of a precise reference like the points O in FIG. 1, the distance wt is assumed to be the maximum measurement of the cord of the tyre.

The expression "camber angle" is used to indicate the angle between the equatorial plane of the tyre mounted on the wheel of the motorcycle and a plane perpendicular to the road surface.

The terms "radial" and "axial" and the expressions "radially inner/outer" and "axially inner/outer" are used referring to a direction substantially parallel and to a direction substantially perpendicular to the equatorial plane of the tyre, respectively, i.e. to a direction substantially perpendicular and to a direction substantially parallel to the rotation axis of the tyre, respectively.

The terms "circumferential" and "circumferentially" are used referring to the direction of annular extension of the tyre, i.e. to the rolling direction of the tyre, which corresponds to a direction lying on a plane coinciding with or substantially parallel to the equatorial plane of the tyre.

The term "substantially axial direction" is used to indicate a direction inclined, with respect to the equatorial plane of the tyre, by an angle comprised between about 70° and about 90°.

The expression "substantially circumferential direction" is used to indicate a direction oriented, with respect to the equatorial plane of the tyre, at an angle comprised between about 0° and about 30°.

The expression "central portion" and "shoulder portion" of the tyre are used to indicate the portion of the tyre astride of the equatorial plane and any one of the two opposite axial end portions of the tyre, respectively.

The expression "elastomeric material" is used to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating.

The term "cord", or the expression "reinforcing cord" is used to indicate an element consisting of one or more thread-like elements or filaments (hereinafter also called "wires" or "fibres") possibly coated by, or incorporated in, a matrix of elastomeric material.

The expression "tangent modulus" is used to indicate the ratio between load and elongation measured at any point of a load-elongation curve according to the BISFA standard. Such a curve is traced by calculating the first derivative of the load-elongation function that defines the aforementioned curve, normalised at the linear density expressed in Tex. The modulus is therefore expressed in cN/Tex.

The expression "initial tangent modulus" is used to indicate the tangent modulus calculated at the point of origin of the load-elongation curve, i.e. for an elongation equal to zero.

The expression "high modulus" is used to indicate an initial modulus equal to or greater than 3000 cN/Tex. The expression "low modulus" is used to indicate an initial modulus lower than 3000 cN/Tex.

The expression "hybrid reinforcing cord" is used to indicate a reinforcing cord comprising at least one wire made of a material having a high modulus and at least another wire made of another material having a low modulus.

The expression "reinforced band-like element" is used to indicate an elongated product having a flattened profile in cross section and comprising one or more reinforcing cords extending parallel to the longitudinal extension of the product and incorporated in, or at least partially coated by, at least one layer of elastomeric material.

The expression "radial carcass structure" is used to indicate a carcass structure comprising a plurality of reinforcing cords each of which being oriented along a substantially axial direction. Such reinforcing cords can be incorporated in a single carcass ply or in many carcass plies (preferably two) which are radially juxtaposed one above the other.

The expression "zero-degree belt structure" is used to indicate a belt structure comprising at least one reinforcing cord wound on the carcass structure according to a substantially circumferential winding direction.

The expression "linear density" or "count" of a cord or of a wire or of a fibre is used to indicate the weight of the cord or of the wire or of the fibre per unit length. The linear density is measurable in dtex (grams per 10 km of length).

For the purposes of the present invention, the measurement of the linear density and of the initial tangent modulus is made referring to flat wires, without twists applied in the testing step, according to the tests regulated by BISFA (Bureau International pour la Standardisation des Fibres Artificielles). In particular:

for aramid fibres (AR), reference is made to BISFA—Testing methods for yarns of para-aramid fibres; 2002 edition:
Determining the linear density—Chapter 6;
Determining the tensile properties—Chapter 7—Testing procedure—Paragraph 7.5—with procedure with initial pretensioning;
Tractions carried out with Zwick dynamometer—Roell 2010;

for Polyester (PET), reference is made to BISFA—methods for testing polyester yarns—2004 edition:
Determining the linear density—Chapter 6—Procedure A;
Determining the tensile properties—Chapter 7—Procedure A;
Preparation of laboratory samples: Preparation of samples in relaxation—paragraph 7.4.1.1=>preparation of samples on collapsible reel;
Preparation of laboratory samples and carrying out the test: Manual test—paragraph 7.5.2.1=>c);
Start procedure=>e) pretension at the start of procedure;
Tractions carried out with Zwick dynamometer—Roell 2010 for Nylon (NY), reference is made to BISFA—Testing methods for polyamide yarns—2004 edition:
Determining the linear density—Chapter 6—Procedure A;
Determining the tensile properties—Chapter 7—Procedure A;
Preparation of laboratory samples: Preparation of samples in relaxation—paragraph 7.4.1.1=>preparation of samples on collapsible reel;
Preparation of laboratory samples and carrying out the test: Manual test—paragraph 7.5.2.1=>c);
Start procedure=>e) pretension at the start of procedure;
Tractions carried out with Zwick dynamometer—Roell 2010.

In recent times the Applicant has found that the market of motorcycles having a piston displacement lower than 500 cc, in addition to be in continuous growth, requires increased performance, both in terms of speed and in terms of load, which is not always achievable through the structures of medium performance tyres currently produced and commercialised.

The Applicant has thus thought to provide a new type of medium performance tyre having a carcass structure (preferably a radial carcass structure) and, in radially outer position with respect to the carcass structure, a zero-degree belt structure.

However, the Applicant has observed that the use in the zero-degree belt structure of steel reinforcing cords, like in high and ultra-high performance tyres, if on the one hand would allow to achieve the increased performance required by the market, on the other hand would make the zero-degree belt structure oversized in terms for example of rigidity with respect to the real requirements of the market of tyres for medium performance.

The Applicant has thus thought to use, in the zero-degree belt structure of the aforementioned new type of medium performance tyres, reinforcing cords that are more extensible and less rigid, so as to allow a greater elastic response to high deformations.

According to the Applicant, a solution suitable for satisfying the aforementioned requirements in terms of behaviour of the tyre (for example elastic response to high deformations) would be using in the zero-degree belt structure of the aforementioned type of medium performance tyres reinforcing cords made of a low modulus material, precisely like in medium performance tyres currently produced and commercialised by the Applicant.

The Applicant has however observed that nylon reinforcing cords can limit the increase in performance required by the market. This is due to the fact that nylon has a modulus that, above a certain critical elongation value, decreases and in order to obtain the desired increased performance the nylon reinforcing cords would work with elongations greater than the aforementioned critical elongation value.

Moreover, the Applicant has observed that the use of nylon reinforcing cords would result in further drawbacks.

A first drawback is correlated to the fact that, due to the limited thermostability and high extensibility of nylon, at the end of the vulcanisation the zero-degree belt structure would undergo a high free shrinkage, which would produce a very flat outer profile in the deflated tyre. According to the Applicant this would in practice constitute a visual defect that could limit the commercial success of the tyre. Indeed, the user interested to motorcycles, and more in particular to motorcycles capable of providing medium-high performance, looks for, and appreciates, tyres having very curved profiles even when deflated. Such a user, when observing a tyre having a very flat outer profile when deflated, would get a negative perception of the effective capability of such a tyre to provide the require performance.

A very flat outer profile would also result in a non-progressive behaviour of the tyre as the camber angle increases, with consequent dissatisfaction of the motorcyclist.

The very flat outer profile would also result in a high difference in stress between the central portion of the tyre and the shoulder portions thereof and, consequently, a response of the tyre during travel in a straight line different from that during cornering and not optimised.

A further drawback which is also correlated to the high extensibility of nylon would be the excessive dimensional variability of the inflated tyre, with consequent difficulty in maintaining the profile defined in the design step. Moreover, a high stress would occur on the layer of elastomeric material at the bottom of the recesses of the tread band as soon as the tyre is inflated, with the consequent risk of generation of cracks or micro-lacerations, which would inevitably compromise the quality of the tyre.

The Applicant has thus though to use in the zero-degree belt structure of the aforementioned new type of less performing tyres reinforcing cords capable of, like those made of nylon, ensuring an adequate elastic response both to low loads, so as to allow processability in a mono-phase manufacturing system, and to high loads, so as to obtain the desired resistance to impacts on irregular or rough road surfaces. However, according to the Applicant such reinforcing cords should, unlike those made of nylon and like those with high modulus, possess an ever-increasing modulus as the elongation increases, so as to obtain a progressively increasing rigidification of the belt structure as the stresses increase and, in this way, achieve the desired increased performance. The aforementioned reinforcing cords should also be made of a material having a sufficient thermostability and dimensional constancy, so as to overcome the drawbacks discussed above with reference to nylon.

The Applicant has found that it is possible to achieve all of the requirements discussed above by using, in the zero-degree belt structure of the aforementioned new type of less performing tyres, hybrid reinforcing cords having an elongation greater than 4% when subjected to a load equal to about 50 N (low loads) and a monotonic tangent modulus as the elongation increases for elongations greater than 4% and for all of the elongation values reached during travel of the tyre. Indeed, the Applicant has verified that:
- the aforementioned elongation at low loads makes it possible to give an adequate elastic response also to high deformations, as well as to carry out a mono-phase manufacturing process and, consequently, to keep the sale price of the tyre down;
- the aforementioned monotonic progression of the modulus results in a progressively increasing rigidity of the belt structure as the load and the travel speed of the tyre increase, thus obtaining a thrust progressivity that provides the desired increased performance;
- the presence, in hybrid reinforcing cords, of a high modulus material provides for a greater thermostability and dimensional constancy.

The Applicant would have expected that the presence in the aforementioned tyres of hybrid reinforcing cords made of a high modulus material would have resulted in a greater rigidity, with respect to the one of nylon reinforcing cords, even at low loads, in addition to at high loads, in practice preventing the actuation of a mono-phase manufacturing process.

The Applicant has instead found that hybrid reinforcing cords maintain the desired deformability at low loads, providing the desired rigidity only at high loads.

Without wishing to link to any interpretative theory, the Applicant believes that in hybrid reinforcing cords the contribution provided by the high modulus material progressively increases as the load increases, taking a preponderant weight with respect to the contribution provided by the low modulus material only at high loads.

The present invention therefore relates to a motorcycles tyre comprising a carcass structure, a zero-degree belt structure arranged in a radially outer position with respect to the carcass structure and a tread band arranged in a radially outer position with respect to the belt structure.

Preferably, the carcass structure is a radial carcass structure.

Preferably, the belt structure comprises at least one hybrid reinforcing cord.

Preferably, said at least one reinforcing cord has an elongation greater than 4% when subjected to a load equal to about 50 N.

Preferably, said at least one reinforcing cord has a tangent modulus with a monotonic progression as the elongation increases for elongations comprised between 4% and at least 9%.

The Applicant believes that a tyre having a load-bearing structure as discussed above has the advantageous characteristics, in terms of resistance to impacts, processability and cost, of the less performing tyres currently produced and commercialised by the Applicant. With respect to the latter, however, the tyre of the invention has a greater thermostability and dimensional constancy and has a thrust progressivity as the load increases which makes it possible to obtain the increased performance required by the market.

In preferred embodiments, said at least one reinforcing cord has, at low loads, an elongation equal to or greater than that the one of nylon reinforcing cords used in the less performing tyres currently produced and commercialised by the Applicant.

Preferably, when said at least one reinforcing cord is subjected to a load equal to about 50 N said elongation is greater than 5.5%, more preferably equal to or greater than 6%, for example equal to about 7%.

Preferably, when said at least one reinforcing cord is subjected to a load comprised between about 10 N and about 50 N said elongation is comprised between about 1% and about 7%.

Preferably, when said at least one reinforcing cord is subjected to a load equal to about 40 N said elongation is greater than 5%, more preferably equal to or greater than 5.5%, for example equal to about 6%.

Preferably, when said at least one reinforcing cord is subjected to a load equal to about 30 N said elongation is greater than 4%, more preferably equal to or greater than 4.5%, for example equal to about 5%.

Preferably, when said at least one reinforcing cord is subjected to a load equal to about 20 N said elongation is greater than 2%, more preferably equal to or greater than 3%, for example equal to about 4%.

Preferably, when said at least one reinforcing cord is subjected to a load equal to about 10 N said elongation is greater than 1%, more preferably equal to or greater than 1.5%, for example equal to about 2%.

Preferably, said modulus has a monotonic progression as the elongation increases for elongations up to at least 11%, even more preferably up to at least 12% and, more in general, up to the maximum elongation value reachable during travel of the tyre.

In preferred embodiments, said at least one reinforcing cord has an elongation equal to or greater than the one of the aforementioned nylon reinforcing cords even when subjected to medium loads (loads comprised between about 50 N and about 130 N).

Preferably, when said at least one reinforcing cord is subjected to loads comprised between about 50 N and about 130 N said elongation is comprised between about 5.5% and about 10.5%.

Preferably, when said at least one reinforcing cord is subjected to a load equal to about 60 N said elongation is greater than 6.5%, more preferably equal to or greater than 7%, for example equal to about 7.5%.

Preferably, when said at least one reinforcing cord is subjected to a load equal to about 70 N said elongation is greater than 7%, more preferably equal to or greater than 7.5%, for example equal to about 8%.

Preferably, when said at least one reinforcing cord is subjected to a load equal to about 80 N said elongation is greater than 7.5%, more preferably equal to or greater than 8%, for example equal to about 8.5%.

Preferably, when said at least one reinforcing cord is subjected to a load equal to about 90 N said elongation is greater than 8.5%, for example equal to about 9%.

Preferably, when said at least one reinforcing cord is subjected to a load equal to about 100 N said elongation is greater than 9%, for example equal to about 9.5%.

Preferably, when said at least one reinforcing cord is subjected to a load equal to about 120 N said elongation is equal to or greater than about 10%.

In the preferred embodiments, the tangent modulus of said at least one reinforcing cord is greater than the one of nylon reinforcing cords for all elongation values comprised between about 5% and at least 9%, preferably at least 10%.

Preferably, when said at least one reinforcing cord is subjected to a load equal to about 130 N said elongation is equal to about 10.5%. Such a reinforcing cord in such a case has an elongation substantially equal to the one of the aforementioned nylon reinforcing cords but a tangent modulus greater than the latter, thus being more rigid.

In preferred embodiments, said at least one reinforcing cord has, at high loads (loads greater than about 130 N), an elongation lower than the one of the aforementioned nylon reinforcing cords. Therefore, at high loads, they are more rigid than the latter. Such greater rigidity, together with the fact that it progressively increases as the load increases, provides the desired increased performance with respect to the less performing tyres currently produced and commercialised by the Applicant.

Preferably, when said at least one reinforcing cord is subjected to a load equal to about 140 N said elongation is lower than about 11.

Preferably, when said at least one reinforcing cord is subjected to a load equal to about 150 N said elongation is lower than about 12%.

Preferably, when said at least one reinforcing cord is subjected to a load equal to about 160 N said elongation is lower than about 13%.

Preferably, said tangent modulus is greater than about 800 cN/Tex, more preferably greater than about 1000 cN/Tex, even more preferably greater than about 1200 cN/Tex, for example equal to about 1500 cN/Tex, for elongations equal to about 9%.

Preferably, said at least one reinforcing cord has an ultimate tensile strength greater than, or equal to, about 180 N, more preferably greater than or equal to about 200 N, for example equal to about 210 N.

Preferably, said at least one reinforcing cord comprises two textile wires twisted together.

Preferably, a first wire of said two wires has a high initial tangent modulus.

Preferably, a second wire of said two wires has a low initial tangent modulus.

Preferably, said first wire has an initial tangent modulus equal to or greater than about 3000 cN/tex, even more preferably equal to or greater than about 4000 cN/tex.

Preferably, said first wire has an initial tangent modulus equal to or lower than about 7000 cN/tex.

In preferred embodiments, said first wire has an initial tangent modulus comprised between about 3000 cN/tex and about 7000 cN/tex, more preferably comprised between about 4000 cN/tex and about 7000 cN/tex, the extreme values being included.

Preferably, said second wire has an initial tangent modulus equal to or lower than about 3000 cN/tex, preferably equal to or lower than about 2000 cN/tex, even more preferably equal to or lower than about 1500 cN/tex.

Preferably, said second wire has an initial tangent modulus equal to or greater than about 200 cN/tex.

In preferred embodiments, said second wire has an initial tangent modulus comprised between about 200 cN/tex and about 3000 cN/tex, more preferably comprised between about 200 cN/tex and about 2000 cN/tex, even more preferably comprised between about 200 cN/tex and about 1500 cN/tex, the extreme values being included.

Preferably, said first wire is made of fibres of aromatic polyamide (aramid). Alternatively, said first wire can be made of any of the following materials: fibres of polyethylene naphthalate (PEN), fibres of polyketone, fibres of polyvinyl alcohol, fibres of cellulose having high initial tangent modulus (for example rayon fibres), glass fibres, carbon fibres.

Preferably, said second wire is made of fibres of aliphatic polyamide (nylon). Alternatively, said second wire can be made of fibres of polyethylene terephthalate (PET).

Preferably, said first wire has a different linear density, more preferably lower, than the one of said second wire.

Preferably, said first wire has a linear density greater than, or equal to, about 440 dtex, more preferably greater than, or equal to, about 840 dtex.

Preferably, said first wire has a linear density lower than, or equal to, about 1680 dtex, more preferably lower than, or equal to, about 1100 dtex.

In preferred embodiments, said first wire has a linear density comprised between about 440 dtex and about 1680 dtex, more preferably between about 840 dtex and about 1100 dtex, the extreme values being included. For example, the linear density of said first wire is equal to about 840 dtex.

Preferably, said second wire has a linear density greater than, or equal to, about 470 dtex, more preferably greater than, or equal to, about 940 dtex.

Preferably, said second wire has a linear density lower than, or equal to, about 1880 dtex, more preferably lower than, or equal to, about 1400 dtex.

In preferred embodiments, said second wire has a linear density comprised between about 470 dtex and about 1880 dtex, more preferably comprised between about 940 dtex and about 1400 dtex, the extreme values being included. For example, the linear density of said second wire is equal to about 940 dtex.

Preferably, each of said two wires is twisted on itself with a number of twists per metre that is different from the one of the other wire.

More preferably, the number of twists per metre of said first wire is greater than the one of said second wire.

Preferably, the twists applied to said first wire are greater than or equal to about 250 twists/m, more preferably greater than or equal to about 400 twists/m.

Preferably, the twists applied to said second wire are lower than or equal to about 200 twists/m, more preferably lower than or equal to about 135 twists/m.

Preferably, the twists applied to the reinforcing cord formed by the abovementioned wires are greater than or equal to about 250 twists/m, more preferably greater than or equal to about 400 twists/m.

Preferably, said carcass structure comprises a plurality of reinforcing cords made of textile material, for example nylon, rayon, PET, PEN, Lyocell, aramid.

Preferably, said tyre has a speed index, according to E.T.R.T.O. classification, lower than or equal to V, corresponding to a maximum speed up to 240 km/h. More preferably, such a speed index is equal to or lower than H, corresponding to a maximum speed up to 210 km/h.

Preferably, said tyre has a weight lower than about 3900 g, more preferably lower than about 3700 g, for example equal to about 3600 g, in the case of a front tyre.

Preferably, said tyre has a weight lower than about 5800 g, more preferably lower than about 5600 g, for example equal to about 5500 g, in the case of a rear tyre.

BRIEF DESCRIPTION OF THE DRAWINGS

Further characteristics and advantages of the tyre of the present invention will become clearer from the following detailed description of some preferred embodiments thereof, made with reference to the attached drawings. In such drawings.

DETAILED DESCRIPTION OF EMBODIMENTS

In FIG. 1, a motorcycles tyre according to the present invention is wholly indicated with reference numeral 100. In particular, it is a tyre configured to be used on a front or rear wheel of a motorcycle having a piston displacement lower than 500 cc, preferably greater than 125 cc.

The tyre 100 preferably has a speed index equal to or lower than V, corresponding to a maximum speed up to 240 km/h, more preferably equal to or lower than H, corresponding to a maximum speed up to 210 km/h.

The tyre 100 preferably has a weight lower than about 3900 g, more preferably lower than about 3700 g, for example equal to about 3600 g, in the case of a front tyre and, preferably, lower than about 5800 g, more preferably lower than about 5600 g, for example equal to about 5500 g, in the case of a rear tyre.

In the tyre 100 an equatorial plane X-X and a rotation axis Z perpendicular to the equatorial plane X-X are defined. An axial (or transversal or lateral) direction, substantially parallel to the rotation axis Z and a circumferential (or longitudinal) direction, substantially parallel to the equatorial plane X-X and corresponding to the rolling direction of the tyre 100 are also defined.

The tyre 100 comprises a carcass structure 2 comprising in turn at least one carcass ply.

The carcass structure 2 has, in an axial section thereof, a substantially toroidal configuration.

The carcass structure 2 comprises a crown portion 2a symmetrically arranged with respect to the equatorial plane X-X, and opposite side portions 2b arranged on axially opposite sides with respect to the crown portion 2a.

The carcass structure 2 illustrated comprises a carcass ply 3 extending axially from a side portion 2b of the carcass structure 2 to the opposite side portion 2b.

The carcass ply 3 is preferably coated, on the radially inner wall thereof, by a sealing layer 4, so-called "liner", essentially consisting of a layer of elastomeric material impermeable to air, configured to ensure the hermetic seal of the tyre 100 itself once inflated.

The carcass ply 3 is engaged, at the respective axially opposite side edges 3a thereof, with respective annular reinforcing structures 5, typically called "bead cores".

Each side edge 3a of the carcass ply 3 is turned around a respective bead core 5.

A tapered elastomeric filler 6 is applied on the outer perimeter edge of the bead cores 5. The elastomeric filler 6 occupies the space defined between the carcass ply 3 and the respective turned side edge 3a.

In an alternative embodiment that is not illustrated, the carcass ply has its opposite side edges associated without turning with particular annular reinforcing structures provided with two metallic annular inserts. In this case, a filler made of elastomeric material can be arranged in an axially outer position with respect to the first annular insert. The second annular insert is, on the other hand, arranged in an axially outer position with respect to the end of the carcass ply. Finally, a further filler that completes the annular reinforcing structure cab be provided in an axially outer position with respect to said second annular insert, and not necessarily in contact with it.

The area of the tyre comprising the bead core 5 and the elastomeric filler 6 forms the so-called "bead", globally indicated in FIG. 1 with 15. The bead 15 is configured to be anchored through elastically forced fitting of the tyre on a corresponding mounting rim, not illustrated.

A belt structure 10, described hereinafter in greater detail, is provided in a radially outer position with respect to the aforementioned carcass structure 2, at at least one axial portion of the crown portion 2a.

A tread band 20 is provided in a radially outer position with respect to the belt structure 10. By means of the tread band 20 the tyre 100 makes contact with the road surface.

The tread band 20 typically has a tread pattern defined by a plurality of grooves 21 variously positioned in the different areas of the tyre. For the sake of clarity of illustration, FIG. 1 illustrates and/or shows only some of the grooves 21 of the tyre 100.

The tyre 100 can also comprise, at each of the opposite side portions 2b of the carcass structure 2, a respective sidewall 25 that extends from the tread band 20 to the bead 15 of the tyre 100.

The tyre 100 of the present invention is distinguished by a high transversal curvature (and thus by a high curvature ratio) and, preferably, lowered sidewalls.

Preferably, the curvature ratio is greater than or equal to 0.200, more preferably greater than or equal to 0.250. In the case in which the tyre 100 is configured to be mounted on wheels for more sporting uses, the curvature ratio can also exceed 0.300. Such a curvature ratio is typically lower than or equal to 0.800, preferably lower than or equal to 0.500, even more preferably lower than or equal to 0.400.

With reference to FIG. 1, the expression "tyre with low or lowered sidewalls" is used to indicate a tyre in which the ratio between the distance H-ht and the height H, measured on the equatorial plane X-X between the radially highest point of the tread band 20 and the fitting diameter, substantially defined by the reference line L passing through the beads 15 of the tyre, is preferably lower than 0.65, more preferably lower than 0.6, for example equal to 0.55.

The carcass ply 3 of the carcass structure 2 is preferably made of elastomeric material and comprises a plurality of reinforcing cords 30 that are preferably arranged substantially parallel to one another and oriented along a substantially axial direction. More preferably, each reinforcing cord 30 belongs to a respective radial plane of the tyre 100.

The carcass structure 2 is therefore a radial carcass structure.

For the sake of clarity of illustration, in FIG. 1 reference numeral 30 is associated with only some of the reinforcing cords illustrated.

In the embodiment illustrated in FIG. 1 all of the reinforcing cords 30 belong to a single carcass ply 3.

In an alternative embodiment that is not illustrated, the carcass structure 2 comprises at least two carcass plies radially juxtaposed one above the other and the reinforcing cords 30 are always arranged substantially parallel to one another and oriented along a substantially axial direction.

In another embodiment that is not illustrated the carcass structure 2 comprises at least two carcass plies radially juxtaposed one above the other, each carcass ply comprising a plurality of reinforcing cords arranged substantially parallel to one another. Said at least two carcass plies are crossed one above the other so that the reinforcing cords of a first carcass ply are inclined with respect to the reinforcing cords of the second carcass ply and to the equatorial plane X-X.

In the first carcass ply the reinforcing cords are arranged so as to form an angle with the equatorial plane X-X comprised in the range between about 10° and about 70°, preferably between about 15° and about 45°.

In the second carcass ply the reinforcing cords are arranged so as form an angle with the equatorial plane X-X comprised in the range between about 10° and about 70°, preferably between about 15° and about 45°.

The reinforcing cords of the second carcass ply are arranged in an opposite manner with respect to the reinforcing cords of the first carcass ply. In other words, the aforementioned reinforcing cords have the same angle of inclination with respect to the equatorial plane X-X, but they have an opposite orientation.

The reinforcing cords 30 of the carcass structure 2 illustrated in FIG. 1 preferably comprise textile cords selected from those usually adopted in the building of tyre carcasses, for example nylon, rayon, PET, PEN, Lyocell, aramid, with elementary wire having a diameter comprised between about 0.35 mm and about 1.5 mm.

The belt structure 10 of the tyre 100 is of the zero degrees type. It is formed by winding side-by-side in the axial direction onto the crown portion 2a of the carcass structure 2 one or more layers comprising a single reinforcing cord 11, or a reinforced band-like element of rubber-coated fabric comprising a plurality of reinforcing cords 11, to form a plurality of coils 11a substantially oriented according to the circumferential direction of the tyre 100 (preferably with an angle comprised between 0° and 5° with respect to the equatorial plane X-X). In the case in which a reinforced band-like element is used, it can comprise up to seven reinforcing cords 11, more preferably two or three or four reinforcing cords 11.

For the sake of clarity of illustration, in FIG. 1 reference numeral 11a is associated with only some of the coils illustrated and reference numeral 11 is associated with only some of the pieces of reinforcing cord 11 illustrated.

Preferably, the winding defined by the coils 11a extends over the entire crown portion 2a, with a winding pitch that can be constant or variable in the axial direction.

The belt structure 10 can also comprise one or more support layers made of elastomeric material (not illustrated), arranged between the layer of reinforcing cords 11 and the carcass ply 3 and on which the coils 11a are wound. Such layer(s) can extend on a surface having an axial extension substantially corresponding to the surface on which the coils 11a extend.

In an embodiment that is not illustrated, in the tyre 100 a support layer can be provided. The support layer comprises short reinforcing fibres, for example aramid fibres (aromatic polyamides), dispersed in an elastomeric material.

In a further embodiment that is not illustrated, in addition or as an alternative to the support layer described above, at least one layer reinforced with textile cords (totally similar to the cords that can be used in the carcass structure 2) can be provided in the tyre 100. Such a layer is oriented substantially axially (for example with an angle between 65° and 115° with respect to the equatorial plane X-X of the tyre 100) and extends axially at least on the crown portion 2a of the carcass structure 2, or even on a greater portion, but without being turned around the bead wires 5.

In an embodiment of the tyre 100, between the belt structure 10 and the tread band 20 an additional layer (not illustrated) of elastomeric material is arranged. Preferably, such an additional layer extends axially on the crown portion 2a of the carcass structure 2. Alternatively, the aforementioned additional layer can extend axially on a surface which is shorter than the axial extension of the belt structure 10, for example only on axially opposite side portions of the belt structure 10.

The reinforcing cord 11 used in the belt structure 10 of the tyre 100 is a hybrid reinforcing cord made of textile material.

Figure 2:
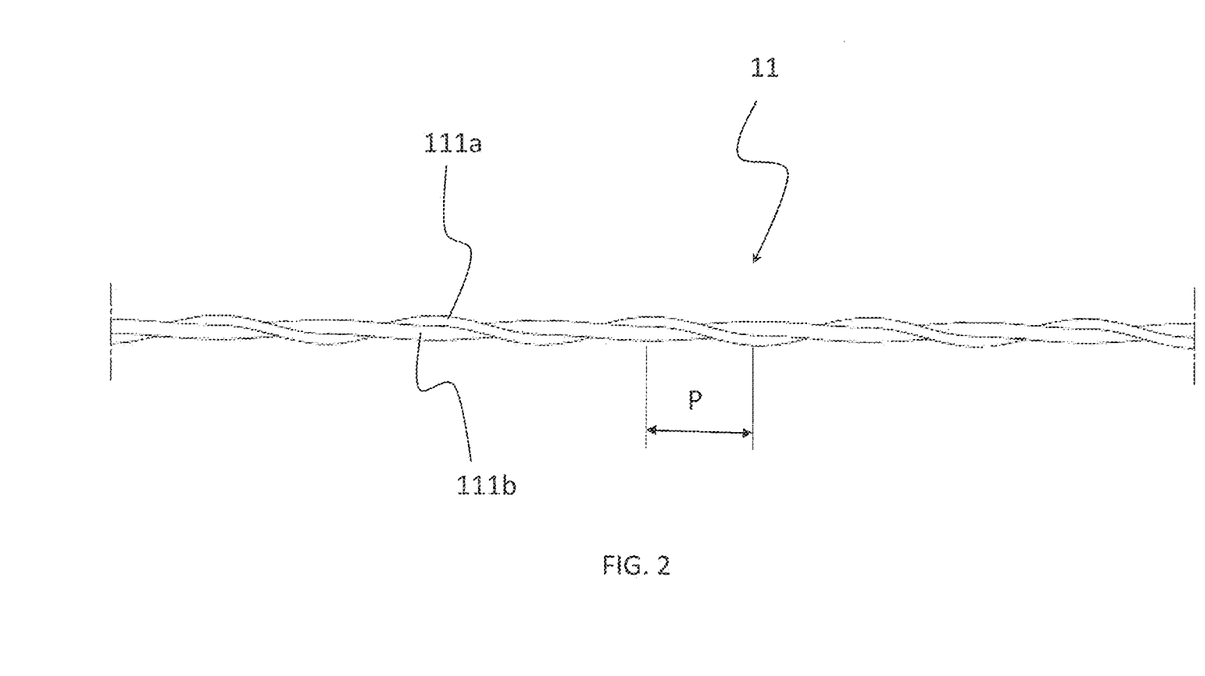
FIG. 2 is a perspective view of an embodiment of a reinforcing cord used in the belt structure of the tyre of FIG. 1.

With reference to FIG. 2, in a preferred embodiment thereof, the reinforcing cord 11 comprises a first wire 111a and a second wire 111b.

Preferably, the first wire 111a has a high initial tangent modulus. More preferably, the first wire 111a has an initial tangent modulus comprised between about 3000 cN/tex and about 7000 cN/tex, even more preferably comprised between about 4000 cN/tex and about 7000 cN/tex, the extreme values being included.

Preferably, the second wire 111b has a low initial tangent modulus. More preferably, the second wire 111b has an initial tangent modulus comprised between about 200 cN/tex and about 3000 cN/tex, more preferably comprised between about 200 cN/tex and about 2000 cN/tex, even more preferably comprised between about 200 cN/tex and about 1500 cN/tex, the extreme values being included.

Preferably, the first wire 111a can be made for example of fibres of aromatic polyamide (aramid). Alternatively, said first wire can be made for example of any of the following materials: fibres of polyethylene naphthalate (PEN), fibres of polyketone, fibres of polyvinyl alcohol, fibres of cellulose having high initial tangent modulus (for example fibres of lyocell or rayon), glass fibres, carbon fibres.

Preferably, the second wire 111b can be made for example of fibres of aliphatic polyamide (nylon) or of fibres of polyethylene terephthalate (PET).

Preferably, the reinforcing cord 11 (i.e. the assembly of the two wires 111a, 111b, twisted together) is twisted on itself with a number of twists per metre greater than or equal to about 250 twists/m, more preferably greater than or equal to about 400.

Each of the wires 111a, 111b, in addition to be twisted around the other wire 111b, 111a, is preferably twisted on itself with a predetermined number of twists per metre that may or may not be equal to the number of twists per metre of the other wire.

In a preferred embodiment of the reinforcing cord 11, the first wire 111a is twisted on itself with a number of twists per metre different to, and preferably greater than, that of the second wire 111b.

Preferably, the first wire 111a has a number of twists per metre greater than or equal to about 250 twists/m, preferably greater than or equal to about 400 twists/m.

Preferably, the second wire 111b has a number of twists per metre lower than or equal to about 200 twists/m, preferably lower than or equal to about 135 twists/m.

Preferably, the first wire 111a has a linear density comprised between about 440 dtex and about 1680 dtex, more preferably between about 840 dtex and about 1100 dtex, for example equal to about 840 dtex.

Preferably, the second wire 111b has a linear density comprised between about 470 dtex and about 1880 dtex, more preferably between about 940 dtex and about 1400 dtex, for example equal to about 940 dtex.

Figure 3:
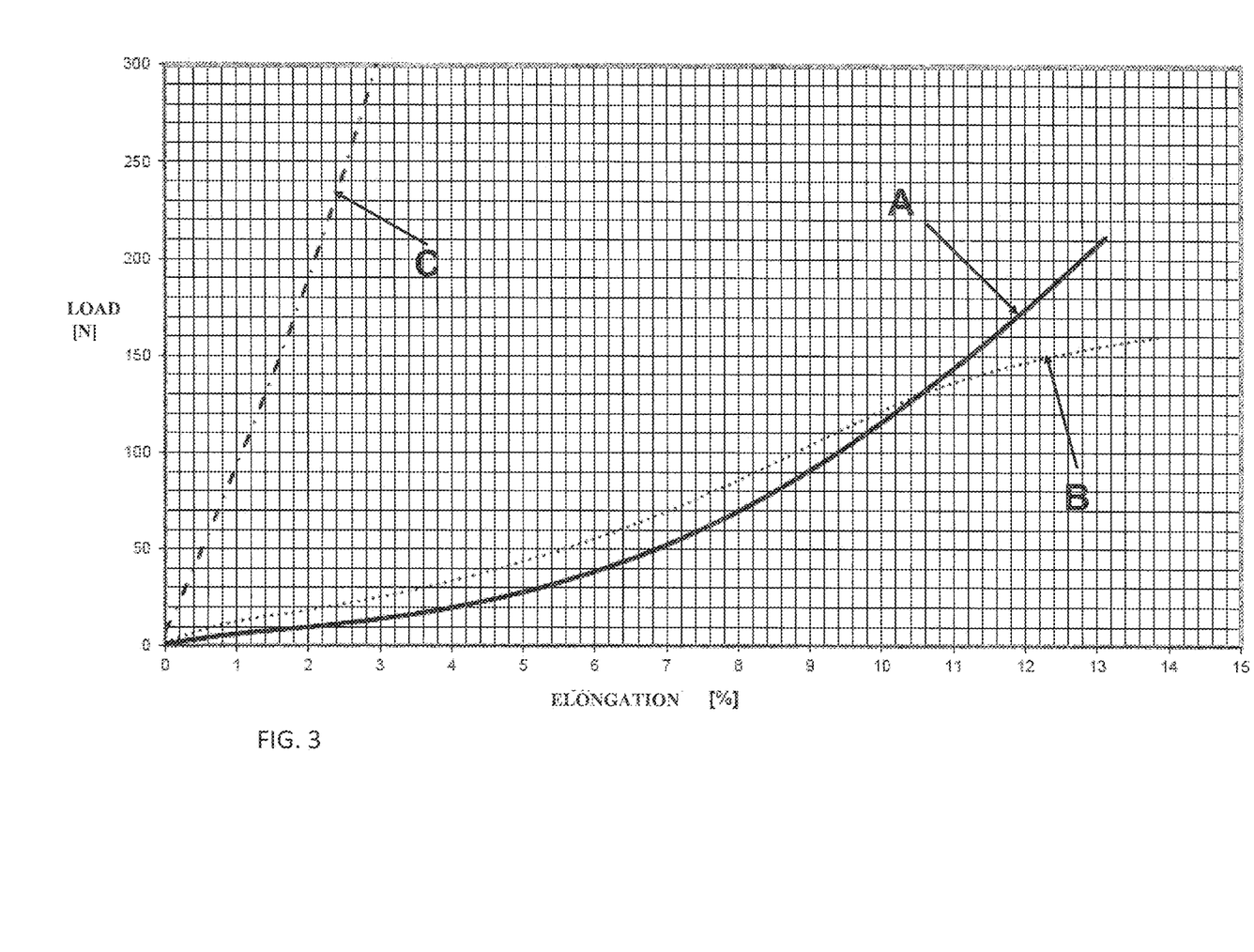
FIG. 3 shows a load-elongation diagram of the reinforcing cord of FIG. 2 (curve A) and of two reinforcing cords used in known tyres produced and commercialised by the Applicant (curves B and C)

The Applicant has subjected the reinforcing cord 11 to traction in accordance with the BISFA method. FIG. 3 shows the load-elongation curve which was obtained. Such a curve is indicated with A.

In FIG. 3 it can be seen that when the reinforcing cord 11 is subjected to a load comprised between about 10 N and about 50 N, its elongation is comprised between about 1% and about 7%.

More in particular:
when the reinforcing cord 11 is subjected to a load equal to about 50 N, its elongation is greater than 4%, more preferably equal to or greater than 5%, even more preferably equal to or greater than 6%, for example equal to about 7%;
when the reinforcing cord 11 is subjected to a load equal to about 40 N, its elongation is greater than 5%, more preferably equal to or greater than 5.5%, for example equal to about 6%;
when the reinforcing cord 11 is subjected to a load equal to about 30 N, its elongation is greater than 4%, more preferably equal to or greater than 4.5%, for example equal to about 5%;
when the reinforcing cord 11 is subjected to a load equal to about 20 N, its elongation is greater than 2%, more preferably equal to or greater than 3%, for example equal to about 4%;
when the reinforcing cord 11 is subjected to a load equal to about 10 N, its elongation is greater than 1%, more preferably equal to or greater than 1.5%, for example equal to about 2%.

The reinforcing cord 11 thus has, at low loads, a high elongation. It thus allows the tyre to be manufactured through a mono-phase process, as desired by the Applicant.

In the graph of FIG. 3 it can also be seen that when the reinforcing cord 11 is subjected to loads comprised between about 50 N and about 130 N, its elongation is comprised between about 5.5% and about 10.5%.

In particular:
when the reinforcing cord 11 is subjected to a load equal to about 60 N, its elongation is greater than 6.5%, more preferably equal to or greater than 7%, for example equal to about 7.5%;
when the reinforcing cord 11 is subjected to a load equal to about 70 N, its elongation is greater than 7%, more preferably equal to or greater than 7.5%, for example equal to about 8%;
when the reinforcing cord 11 is subjected to a load equal to about 80 N, its elongation is greater than 7.5%, more preferably equal to or greater than 8%, for example equal to about 8.5%;
when the reinforcing cord 11 is subjected to a load equal to about 90 N, its elongation is greater than 8.5%, for example equal to about 9%;
when the reinforcing cord 11 is subjected to a load equal to about 100 N, its elongation is greater than 9%, for example equal to about 9.5%;
when the reinforcing cord 11 is subjected to a load equal to about 120 N, its elongation is equal to or greater than about 10%.

The reinforcing cord 11 thus has a high elongation also at medium loads. It thus allows the tyre to deform in order to absorb the roughness typically present on uneven or irregular road surfaces, as required by the market.

In the graph of FIG. 3 it can also be seen that:
when the reinforcing cord 11 is subjected to a load equal to about 130 N, its elongation is equal to about 10.5%;
when the reinforcing cord 11 is subjected to a load equal to about 140 N, its elongation is lower than about 11;
when the reinforcing cord 11 is subjected to a load equal to about 150 N, its elongation is lower than about 12%;
when the reinforcing cord is subjected to a load equal to about 160 N, its elongation is lower than about 13%.

The reinforcing cord 11 thus has, at high loads, a low elongation, highlighted in the graph by an increase of the load-elongation curve as the elongation increases. It thus allows an increased performance of the tyre 100, as required by the market.

The reinforcing cord 11 preferably has an ultimate tensile strength greater than, or equal to, about 180 N, more preferably greater than or equal to about 200 N, for example equal to about 210 N.

Figure 4:
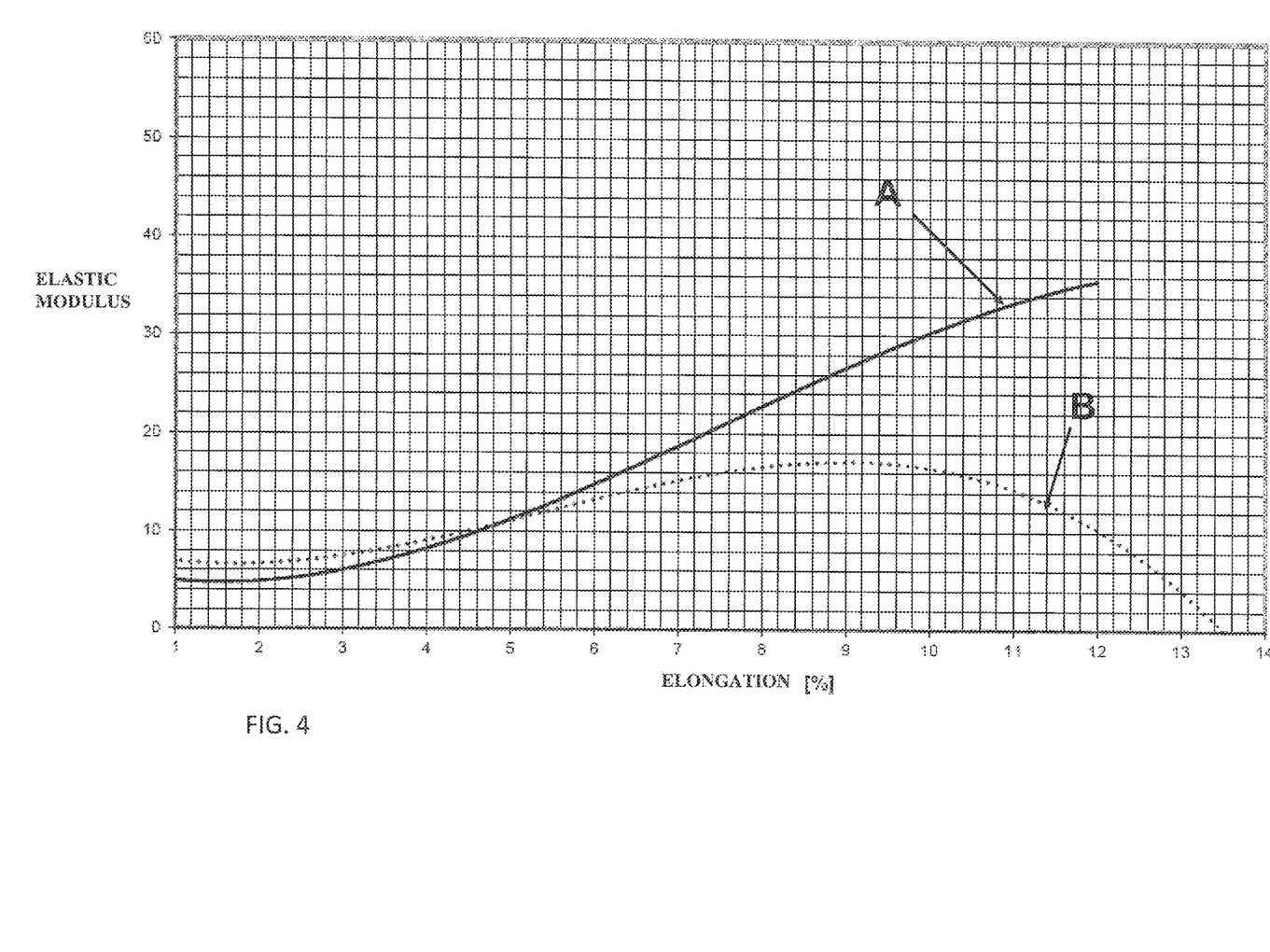
FIG. 4 shows a diagram that illustrates the progression of the tangent modulus as the elongation varies, of the reinforcing cords of curves A and B of FIG. 3.

FIG. 4 illustrates the progression of the tangent modulus of the reinforcing cord 11 at the elongation varies.

In FIG. 4 it can be seen that the tangent modulus of the reinforcing cord 11 has a monotonic progression as the elongation increases for elongations comprised between 4% and at least 9%, more preferably up to at least 10%, even more preferably up to at least 11%, even more preferably up to at least 12% and, more in general, up to the maximum elongation value reachable during travel of the tyre 100.

In particular, at an elongation equal to about 9% the tangent modulus of the reinforcing cord 11 is greater than about 800 cN/Tex, more preferably greater than about 1000 cN/Tex, even more preferably greater than about 1200 cN/Tex, for example equal to about 1500 cN/Tex.

FIG. 3 also shows the load-elongation curves of two reinforcing cords used in known tyres produced and commercialised by the Applicant.

The curve indicated with B belongs to the reinforcing cord currently used in less performing tyres of the Applicant, whereas the curve indicated with C belongs to the reinforcing cord used in high performing tyres of the Applicant.

The reinforcing cord identified by the curve B comprises two wires made of nylon twisted together, both having a linear density equal to 940 dtex. Hereinafter, such a reinforcing cord is indicated as "nylon reinforcing cord".

The reinforcing cord identified by the curve C comprises two wires made of aramid twisted together, both having a linear density equal to 1680 dtex. Hereinafter, such a reinforcing cord is indicated as "aramid reinforcing cord".

In FIG. 3 it can be seen that the aramid reinforcing cord has, at low loads, an elongation lower than 4%, not suitable for allowing the actuation of a mono-phase manufacturing process, whereas the reinforcing cord 11 and the nylon reinforcing cord, having at low loads an elongation greater than 4%, allow the actuation of a mono-phase manufacturing process.

FIG. 4 illustrates, in addition to the progression of the tangent modulus of the reinforcing cord 11, also the progression of the nylon reinforcing cord (the progression of the aramid reinforcing cord is not illustrated since it is off the scale). It should be observed that the nylon reinforcing cord has, at high elongations, a decreasing tangent modulus, not suitable for allowing an increase of performance of the tyre.

Comparing in FIGS. 3 and 4 the curve of the reinforcing cord 11 (curve A) with the one of the nylon reinforcing cords (curve B), it can be seen that the reinforcing cord 11 has:
- when subjected to low and medium loads (lower than 130 N), an elongation greater than the one of the nylon reinforcing cord and, for elongations comprised between about 5% and at least 9%, preferably at least 10%, a tangent modulus always greater than the one of the latter;
- when subjected to a load equal to about 130 N, an elongation substantially equal to the one of the nylon reinforcing cord and a tangent modulus greater than the latter;
- when subjected to high loads (greater than 130 N), an elongation lower than the one of the nylon reinforcing cord and, unlike the latter, a tangent modulus that continues to increase.

The progression of the modulus as the elongation varies at medium and high loads demonstrates that the reinforcing cord 11 initially has an capability to deform even greater than that of the nylon reinforcing cord (which confirms the capability to absorb the deformations caused by uneven or irregular road surfaces) and becomes progressively more rigid as it elongates, working with ever greater moduli as the load increases up to working with high moduli at high elongations. Since the area with high elongations is where the reinforcing cord 11 in order to be able to provide higher performance with respect to those of the less performing tyres currently produced and commercialised by the Appli-cant, the reinforcing cord 11 is suitable for satisfying the demand of increased performance that comes from the market.

As stated above, the use of the reinforcing cord 11 in the tyre 100 provides such a tyre with the desired thermostability and dimensional constancy, overcoming the drawbacks discussed above with reference to nylon reinforcing cords. Such an advantageous effect is described with reference to FIG. 5.

Figure 5:
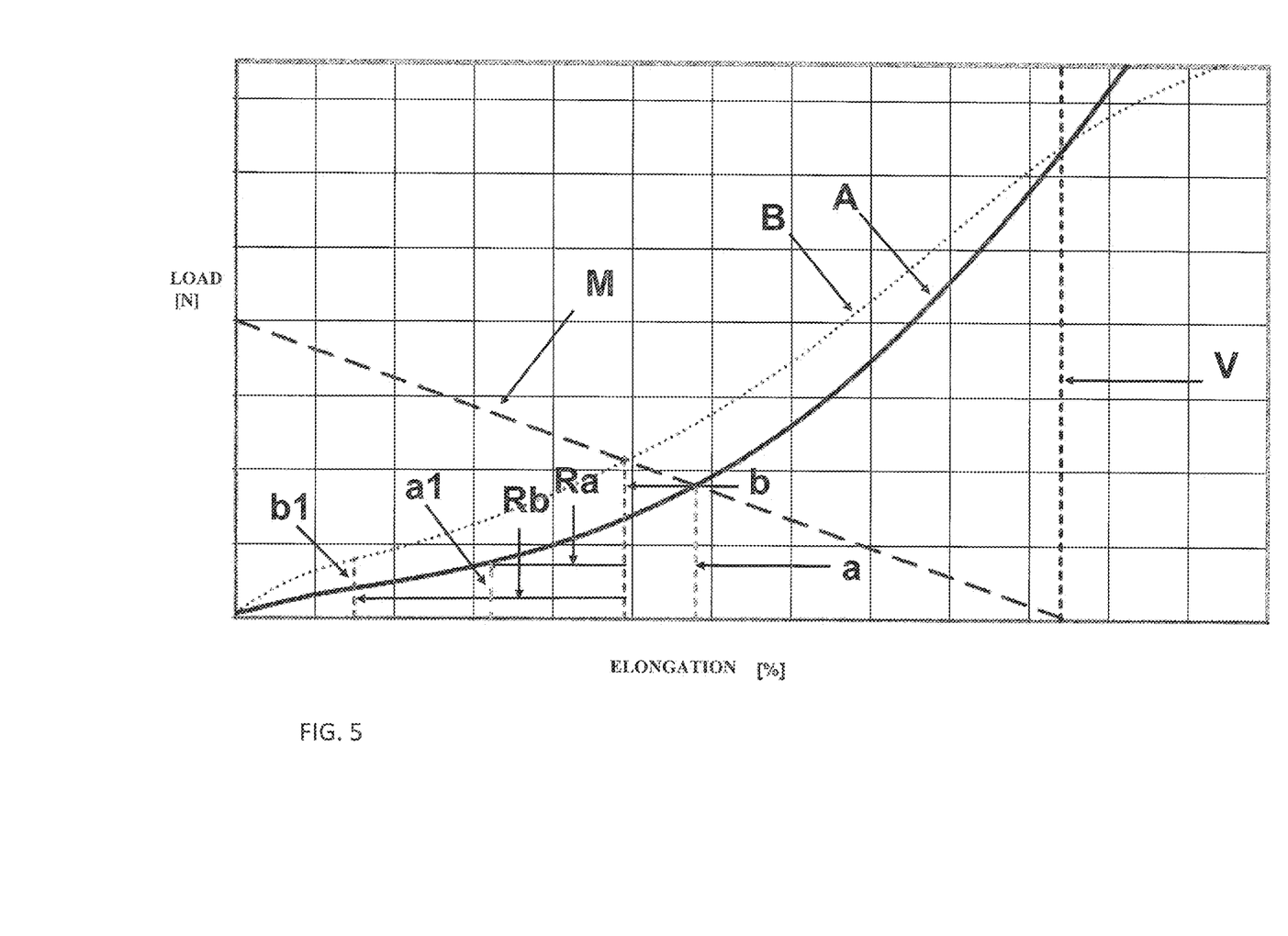
FIG. 5 shows a qualitative graph of the elongation/shrinkage to which the reinforcing cords of curves A and B of FIG. 3 are subjected to during a hypothetical vulcanisation of the tyre and after such vulcanisation.

FIG. 5 schematically and qualitatively illustrates the behaviour of the reinforcing cord 11 and of the nylon reinforcing cord during a hypothetical vulcanisation of the tyre 100, up to the moment at which the aforementioned reinforcing cords reach, the load being equal, the same elongation, and after such vulcanisation.

The line indicated with V identifies the theoretical operative condition of equilibrium at which both the reinforcing cords would be at the end of such a hypothetical vulcanisation and before a hypothetical introduction of the elastomeric material in the vulcanisation mould. Such a condition of equilibrium would be kept by the steam introduced in the mould during vulcanisation.

The line indicated with M identifies the behaviour of the aforementioned elastomeric material once introduced into the vulcanisation mould and following a hypothetical elimination of the steam from the mould. The elastomeric material would be subject to a compression and, consequently, to shrinkage.

The crossing points of the line M with the curves A and B and the lines indicated with a and b identify the condition of equilibrium at which the reinforcing cord 11 and the nylon reinforcing cord, and the elastomeric material that englobes or incorporates them, would respectively be after the elimination of the steam from the vulcanisation mould. It should be observed that thanks to the greater concavity of the curve A with respect to the curve B, the reinforcing cord 11 would be in a condition of greater elongation with respect to the nylon reinforcing cord. This demonstrates that actually at the end of the vulcanisation the tyre 100 has a profile more curved than that which would have had a hypothetical tyre which would differ from the tyre 100 only in that it has, in the zero-degree belt structure thereof, a nylon reinforcing cord.

Considering that the nylon reinforcing cord and the reinforcing cord 11 are also subject to shrinkage, represented in FIG. 5 respectively by the line indicated with Rb and by the line indicated with Ra (the free shrinkage of the nylon reinforcing cord is greater than the one of the reinforcing cord 11), the effective condition of equilibrium of the nylon reinforcing cord and of the reinforcing cord 11 would be the one identified by the line b1 and by the line a1, respectively. The nylon reinforcing cord and the reinforcing cord 11 would thus have, in the aforementioned condition of equilibrium, an even lower elongation with respect to the one identified by the line b and by the line a, respectively. This demonstrates that the tyre 100 has a profile much more curved than the one which would have had the aforementioned hypothetical tyre comprising the nylon reinforcing cord. Such a "very curved" profile would give the user the visual confirmation of the fact that the tyre 100, whilst not being a high performance tyre, achieves the desired increase of performance with respect to current less performing tyres produced and commercialised by the Applicant.

Of course, one skilled in the art can bring further modifications and variants to the tyre described above in order to satisfy specific and contingent application requirements, said variants and modifications in any case being within the scope of protection defined by the following claims.

The invention claimed is:

1. A motorcycles tyre, comprising:
   a carcass structure;
   a zero-degree belt structure arranged in a radially outer position with respect to the carcass structure; and
   a tread band arranged in a radially outer position with respect to the zero-degree belt structure,
   wherein
   the zero-degree belt structure comprises at least one hybrid reinforcing cord comprising two textile wires twisted together with a predetermined twisting pitch,
   a first textile wire of said two textile wires is made of fibres of aromatic polyamide and has a linear density comprised between and including about 440 dtex and about 1100 dtex,
   a second textile wire of said two textile wires is made of fibres of aliphatic polyamide and has a linear density comprised between and including about 940 dtex and about 1880 dtex,
   said at least one hybrid reinforcing cord having a tangent modulus with a monotonic progression as the elongation increases for elongations comprised between 4% and at least 9%,
   when said at least one hybrid reinforcing cord is subjected to a load equal to about 50 N, said at least one hybrid reinforcing cord has an elongation greater than 4%,
   when said at least one hybrid reinforcing cord is subjected to a load equal to about 100 N, said at least one hybrid reinforcing cord has an elongation greater than 9%, and
   when said at least one hybrid reinforcing cord is subjected to a load equal to about 150 N, said at least one hybrid reinforcing cord has an elongation lower than 12%.

2. The motorcycles tyre according to claim 1, wherein said carcass structure is a radial carcass structure.

3. The motorcycles tyre according to claim 2, wherein, when said at least one hybrid reinforcing cord is subjected to a load comprised between about 10 N and about 50 N, said at least one hybrid reinforcing cord has an elongation comprised between about 1% and about 7%.

4. The motorcycles tyre according to claim 3, wherein, when said at least one hybrid reinforcing cord is subjected to a load equal to about 20 N, said at least one hybrid reinforcing cord has an elongation greater than 2%.

5. The motorcycles tyre according to claim 4, wherein, when said at least one hybrid reinforcing cord is subjected to loads comprised between about 50 N and about 130 N, said at least one hybrid reinforcing cord has an elongation comprised between about 5.5% and about 10.5%.

6. The motorcycles tyre according to claim 1, wherein said modulus is greater than about 800 cN/Tex for elongations equal to about 9%.

7. The motorcycles tyre according to claim 1, wherein said at least one hybrid reinforcing cord has an ultimate tensile strength greater than, or equal to, about 180 N.

8. The motorcycles tyre according to claim 1, wherein said two textile wires have mutually different linear densities.

9. The motorcycles tyre according to claim 1, wherein the first textile wire of said two textile wires has a high initial tangent modulus.

10. The motorcycles tyre according to claim 9, wherein the second textile wire of said two textile wires has a low initial tangent modulus.

11. The motorcycles tyre according to claim 1, wherein the first textile wire of said two textile wires has an initial tangent modulus comprised between about 3000 cN/tex and about 7000 cN/tex, end values included.

12. The motorcycles tyre according to claim 11, wherein the second textile wire of said two textile wires has an initial tangent modulus comprised between about 200 cN/tex and about 3000 cN/tex.

13. The motorcycles tyre according to claim 1, wherein each of said two textile wires is twisted on itself with a different number of twists per meter from each other.

14. The motorcycles tyre according to claim 1, wherein said tyre has a speed index lower than or equal to V according to an E.T.R.T.O. classification.

* * * * *